(12) United States Patent
Uralsky

(10) Patent No.: US 9,390,540 B2
(45) Date of Patent: Jul. 12, 2016

(54) DEFERRED SHADING GRAPHICS PROCESSING UNIT, GEOMETRY DATA STRUCTURE AND METHOD OF PERFORMING ANTI-ALIASING IN DEFERRED SHADING

(71) Applicant: Nvidia Corporation, Santa Clara, CA (US)

(72) Inventor: Yury Uralsky, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 321 days.

(21) Appl. No.: 13/725,721

(22) Filed: Dec. 21, 2012

(65) Prior Publication Data

US 2014/0176549 A1 Jun. 26, 2014

(51) Int. Cl.
*G06T 15/00* (2011.01)

(52) U.S. Cl.
CPC .................. *G06T 15/005* (2013.01)

(58) Field of Classification Search
CPC ....... G06T 15/40; G06T 15/405; G06T 15/80; G06T 2215/12; G06T 15/30; G06F 17/16; G06F 17/30324
See application file for complete search history.

(56) References Cited

U.S. PATENT DOCUMENTS

| 6,147,690 A * | 11/2000 | Cosman | 345/592 |
| 7,006,110 B2 * | 2/2006 | Crisu et al. | 345/626 |
| 7,456,846 B1 * | 11/2008 | King | G06T 15/005 345/613 |

OTHER PUBLICATIONS

David Luebke; Surveying Real-Time Rendering Algorithms Beyond Programmable Shading; Nvidia, Beyond Programmable Shading Course; ACM Siggraph; 2010; 74 pages.
Shawn Hargreaves et al.; 6800 Leagues Under the Sea-Deferred Shading; Climax/Nvidia; 2004; 44 pages.
Andrew Lauritzen; Deferred Rendering for Current and Future Rendering Pipelines; Intel Corporation; ACM Siggraph; 2010; 34 pages.
Kevin Gee; Introduction to the Direct3D 11 Graphics Pipeline; NVISION 08, The World of Visual Computing; 2008; 20 pages; NVIDIA Corporation.

* cited by examiner

*Primary Examiner* — Antonio A Caschera

(57) ABSTRACT

A deferred shading GPU, geometry data structure and method. One embodiment of the geometry data structure is found in a graphics processing subsystem operable to render a scene having a pixel represented by samples. The graphics processing subsystem includes: (1) a memory configured to store a geometry data structure associated with the pixel containing surface fragment coverage masks associated with the samples, and (2) a GPU configured to employ the surface fragment coverage masks to carry out deferred shading on the pixel.

18 Claims, 4 Drawing Sheets

DEFERRED SHADING GRAPHICS PROCESSING UNIT, GEOMETRY DATA STRUCTURE AND METHOD OF PERFORMING ANTI-ALIASING IN DEFERRED SHADING

TECHNICAL FIELD

This application is directed, in general, to computer graphics and, more specifically, to deferred shading systems and methods.

BACKGROUND

Many computer graphic images are created by mathematically modeling the interaction of light with a three-dimensional (3D) scene from a given viewpoint. This process, called "rendering," generates a two-dimensional (2D) image of the scene from the given viewpoint, and is analogous to taking a photograph of a real-world scene.

As the demand for computer graphics, and in particular for real-time computer graphics, has increased, computer systems with graphics processing subsystems adapted to accelerate the rendering process have become widespread. In these computer systems, the rendering process is often described as a "graphics pipeline" and is divided between a computer's general purpose central processing unit (CPU) and the graphics processing subsystem, architecturally centered about a graphics processing unit (GPU). Typically, the CPU performs high-level operations, such as determining the position, motion, and collision of objects in a given scene. From these high-level operations, the CPU generates a set of rendering commands and data defining the desired rendered image or images. For example, rendering commands and data can define scene geometry, lighting, shading, texturing, motion, and/or camera parameters for a scene. The graphics processing subsystem creates one or more rendered images from the set of rendering commands and data.

Scene geometry is typically represented by geometric primitives, such as points, lines, polygons (for example, triangles and quadrilaterals), and curved surfaces, defined by one or more two- or three-dimensional vertices. Each vertex may have additional scalar or vector attributes used to determine qualities such as the color, transparency, lighting, shading, and animation of the vertex and its associated geometric primitives. Scene geometry may also be approximated by a depth texture representing view-space Z coordinates of opaque objects covering each pixel.

Many graphics processing subsystems are highly programmable through an application programming interface (API), enabling complicated lighting and shading algorithms, among other things, to be implemented. To exploit this programmability, applications can include one or more graphics processing subsystem programs, which are executed by the graphics processing subsystem in parallel with a main program executed by the CPU. Although not confined merely to implementing shading and lighting algorithms, these graphics processing subsystem programs are often referred to as "shading programs," "programmable shaders," or simply "shaders."

Pixel shaders are one example of shading programs. Pixel shaders are used in a technique known as "deferred shading" in which various lighting and shading processes are decoupled from, and carried out after, geometry rendering in a later stage of the graphics pipeline known as "screen-space." Screen-space rendering occurs just before displaying a scene, and screen-space rendering processes are carried out pixel-by-pixel. Deferred shading is a technique employed by many modern rendering engines that allows rendering of numerous complex geometries and light sources while simplifying the graphics pipeline and maintaining a proportional relationship between quality and performance.

One limitation of screen-space techniques such as deferred shading is the lack of data available at later stages of the graphics pipeline. Screen-space rendering processes rely on data available in a geometry buffer, or "G-buffer." The G-buffer is generated during geometry rendering and rasterizing. The G-buffer stores material properties of all visible geometry per-pixel. A specific limitation of deferred shading is the inability to resolve shading ambiguities in screen-space. This is otherwise referred to as an incompatibility with anti-aliasing, or "AA."

Aliasing in computer graphics occurs when a high-resolution, or "high-frequency," image feature is reproduced at a low-resolution. High-resolution features most occur at boundaries between two or more surfaces in an image. The rendering process is unable to distinguish the boundaries, causing them to become distorted. Shading ambiguities may be resolved during rendering by traditional multisampling AA techniques. However, once the surface boundaries are rasterized to a pixel, ambiguities may remain with respect to how the pixel is to be shaded. This is due to the fact that, in screen-space, the G-buffer lacks sufficient geometric pixel coverage data to perform AA.

Shading during geometry rendering provides other benefits over deferred shading. For example, deferred shading is largely incapable of handling transparency in surfaces. Deferred shading also requires a larger G-buffer so complex compositions of materials in a scene may be shaded appropriately. These disadvantages, together with the incompatibility of AA, sometimes lead graphics developers to avoid deferred shading all-together.

SUMMARY

One aspect provides a graphics processing subsystem operable to render a scene having a pixel represented by samples. The graphics processing subsystem includes: (1) a memory configured to store a geometry data structure associated with the pixel containing surface fragment coverage masks associated with the samples, and (2) a GPU configured to employ the surface fragment coverage masks to carry out deferred shading on the pixel.

Another aspect provides a method of shading a pixel represented by samples in a previously rendered scene, including: (1) employing surface fragment coverage masks associated with the samples in determining a number of unique surface fragments covering the pixel, (2) employing the surface fragment coverage masks in generating a mapping of the unique surface fragments to the samples, and (3) shading the pixel according to the number of unique surface fragments and the mapping.

Yet another aspect provides a graphics processing GPU operable to render a scene containing a pixel, including: (1) a rasterizer configured to generate surface attributes associated with visible geometry within the pixel and surface fragment coverage masks associated with samples of the pixel, (2) a memory configured to store a geometry data structure associated with the pixel containing: (2a) the surface attributes, and (2b) the surface fragment coverage masks, and (3) a shader configured to employ the geometry data structure in shading the pixel.

BRIEF DESCRIPTION

Reference is now made to the following descriptions taken in conjunction with the accompanying drawings, in which.

DETAILED DESCRIPTION

Figure 1:
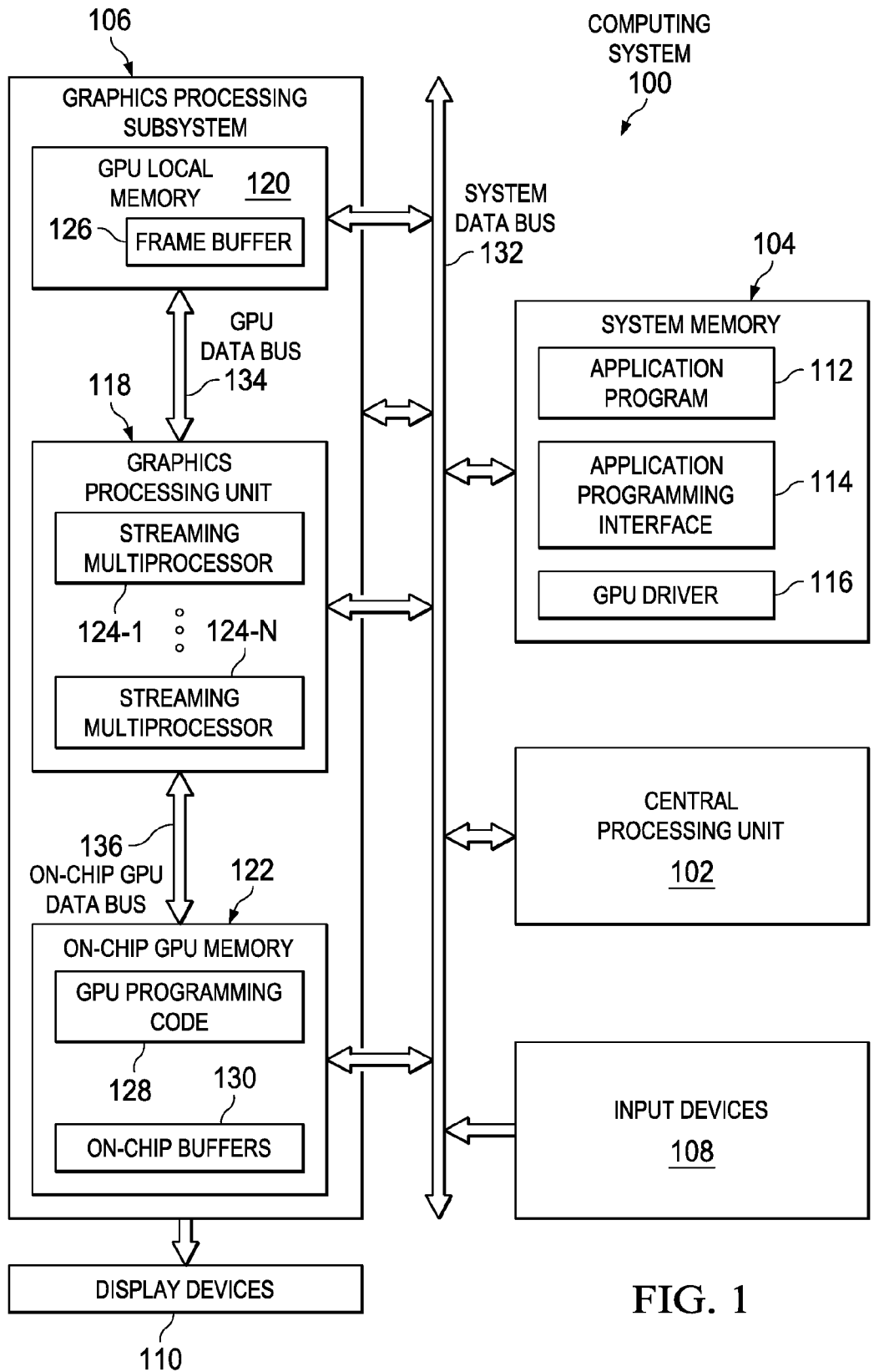
FIG. 1 is a block diagram of a computing system within which the geometry data structure or method of deferred shading introduced herein may be embodied.

Before describing various embodiments of the deferred shading GPU, geometry data structure or method introduced herein, deferred shading and anti-aliasing will be generally described.

Deferred shading is a common technique for decoupling the shading of pixels from the computing of complex geometry and lighting conditions in a scene. The decoupling occurs because deferred shading processes operate on data in the G-buffer and are carried out after complete geometry data have been discarded from the graphics pipeline. Unfortunately, this very fact underlies the limitation mentioned above, namely its incompatibility with anti-aliasing techniques.

Boundaries among surfaces in a scene may be undersampled, and therefore exhibit aliasing. The surfaces each retain their own material characteristics, among other surface attributes. As the surfaces are rasterized, ambiguities arise where a single pixel spans two or more surface fragments. A deferred shading program must resolve the ambiguity to perform its shading, else suffer the aliasing. Traditional per-pixel multi-sampling would be sufficient, but must be performed while geometry is rendered. Per-pixel multi-sampling relies on detailed surface fragment coverage information that is lacking in the G-buffer. This is, in essence, the incompatibility.

Several conventional approaches exist to address the incompatibility between anti-aliasing and deferred shading. One such approach involves supersampling the entire scene to support shading downstream. However, a massive amount of work needs to be performed during the deferred shading stage, making this approach impractical in today's systems. Another approach is to perform selective supersampling by supersampling only pixels recognized as having high-frequency content. However, this approach still performs excessive amount of computation to process those high-frequency pixels. Yet another approach is to perform anti-aliasing after deferred shading, as a post-process. However, this anti-aliasing is particularly ineffective, since most of the needed sub-pixel data is unavailable.

It is fundamentally realized herein that surface fragment coverage information may be recovered in screen-space by storing surface fragment coverage masks in the G-buffer. It is realized herein that, for multi-sampled pixels, the surface fragment coverage masks are generated by the rasterizer per sample. It is further realized herein that a deferred shader can reconstruct surface fragment coverage by compiling the per-sample surface fragment coverage masks into a coverage matrix. It is realized herein that the coverage matrix may be manipulated to determine a number of unique surface fragments in a pixel and to map the unique surface fragments to the samples in the pixel.

It is realized herein that the raster coverage matrix may contain ambiguities that can lead to incorrect reconstruction of surface coverage. It is also realized herein that these ambiguities may be resolved by a "rectifying" process. It is realized herein that an unambiguous coverage matrix is symmetric. It is further realized herein that the raster coverage matrix may be made symmetric by carrying out a bit-wise AND operation between the raster coverage matrix and its transpose.

It is also realized herein that some future GPUs may produce a post-Z coverage mask lacking the ambiguities of the raster coverage mask. The raster coverage mask may indicate a sample is covered, but it may not be visible. It is realized herein that the post-Z coverage mask represents coverage by visible fragments by considering depth data (Z-buffer) in forming the mask. It is further realized herein that storing the post-Z coverage matrix in the G-buffer for use in deferred shading relieves the need for the raster coverage matrix and additional processing to make it symmetric.

Having described various novel realizations, a computing system within which the deferred shading GPU, geometry data structure and method may be embodied or carried out will be described.

FIG. 1 is a block diagram of one embodiment of a computing system 100 in which one or more aspects of the invention may be implemented. The computing system 100 includes a system data bus 132, a central processing unit (CPU) 102, input devices 108, a system memory 104, a graphics processing subsystem 106, and display devices 110. In alternate embodiments, the CPU 102, portions of the graphics processing subsystem 106, the system data bus 132, or any combination thereof, may be integrated into a single processing unit. Further, the functionality of the graphics processing subsystem 106 may be included in a chipset or in some other type of special purpose processing unit or co-processor.

As shown, the system data bus 132 connects the CPU 102, the input devices 108, the system memory 104, and the graphics processing subsystem 106. In alternate embodiments, the system memory 100 may connect directly to the CPU 102. The CPU 102 receives user input from the input devices 108, executes programming instructions stored in the system memory 104, operates on data stored in the system memory 104, and configures the graphics processing subsystem 106 to perform specific tasks in the graphics pipeline. The system memory 104 typically includes dynamic random access memory (DRAM) employed to store programming instructions and data for processing by the CPU 102 and the graphics processing subsystem 106. The graphics processing subsystem 106 receives instructions transmitted by the CPU 102 and processes the instructions to render and display graphics images on the display devices 110.

As also shown, the system memory 104 includes an application program 112, an application programming interface (API) 114, and a graphics processing unit (GPU) driver 116. The application program 112 generates calls to the API 114 to produce a desired set of results, typically in the form of a sequence of graphics images. The application program 112 also transmits zero or more high-level shading programs to the API 114 for processing within the GPU driver 116. The high-level shading programs are typically source code text of high-level programming instructions that are designed to operate on one or more shading engines within the graphics processing subsystem 106. The API 114 functionality is typically implemented within the GPU driver 116. The GPU driver 116 is configured to translate the high-level shading programs into machine code shading programs that are typically optimized for a specific type of shading engine (e.g., vertex, geometry, or fragment).

The graphics processing subsystem 106 includes a graphics processing unit (GPU) 118, an on-chip GPU memory 122, an on-chip GPU data bus 136, a GPU local memory 120, and a GPU data bus 134. The GPU 118 is configured to communicate with the on-chip GPU memory 122 via the on-chip GPU data bus 136 and with the GPU local memory 120 via the GPU data bus 134. The GPU 118 may receive instructions transmitted by the CPU 102, process the instructions to render graphics data and images, and store these images in the GPU local memory 120. Subsequently, the GPU 118 may display certain graphics images stored in the GPU local memory 120 on the display devices 110.

The GPU 118 includes one or more streaming multiprocessors 124. Each of the streaming multiprocessors 124 is capable of executing a relatively large number of threads concurrently. Advantageously, each of the streaming multiprocessors 124 can be programmed to execute processing tasks relating to a wide variety of applications, including but not limited to linear and nonlinear data transforms, filtering of video and/or audio data, modeling operations (e.g., applying of physics to determine position, velocity, and other attributes of objects), and so on. Furthermore, each of the streaming multiprocessors 124 may be configured as a shading engine that includes one or more programmable shaders, each executing a machine code shading program (i.e., a thread) to perform image rendering operations. The GPU 118 may be provided with any amount of on-chip GPU memory 122 and GPU local memory 120, including none, and may employ on-chip GPU memory 122, GPU local memory 120, and system memory 104 in any combination for memory operations.

The on-chip GPU memory 122 is configured to include cached portions of the GPU programming code 128 and on-chip buffers 130. The GPU driver 116 may cache the GPU programming code 128 to the on-chip GPU memory 122 via the system data bus 132. The GPU programming 128 may include a machine code vertex shading program, a machine code geometry shading program, a machine code fragment shading program, or any number of variations of each. The on-chip buffers 130 are typically employed to store shading data that requires fast access to reduce the latency of the shading engines in the graphics pipeline. Since the on-chip GPU memory 122 takes up valuable die area, it is relatively expensive.

The GPU local memory 120 typically includes less expensive off-chip dynamic random access memory (DRAM) and is also employed to store data and programming employed by the GPU 118. As shown, the GPU local memory 120 includes a frame buffer 126. The frame buffer 126 stores data for at least one two-dimensional surface that may be employed to drive the display devices 110. Furthermore, the frame buffer 126 may include more than one two-dimensional surface so that the GPU 118 can render to one two-dimensional surface while a second two-dimensional surface is employed to drive the display devices 110.

The display devices 110 are one or more output devices capable of emitting a visual image corresponding to an input data signal. For example, a display device may be built using a cathode ray tube (CRT) monitor, a liquid crystal display, or any other suitable display system. The input data signals to the display devices 110 are typically generated by scanning out the contents of one or more frames of image data that is stored in the frame buffer 126.

Having generally described deferred shading, anti-aliasing and a computing system within which the deferred shading GPU, geometry data structure and method may be embodied or carried out, various embodiments of the deferred shading GPU, geometry data structure and method will be described.

Figure 2:
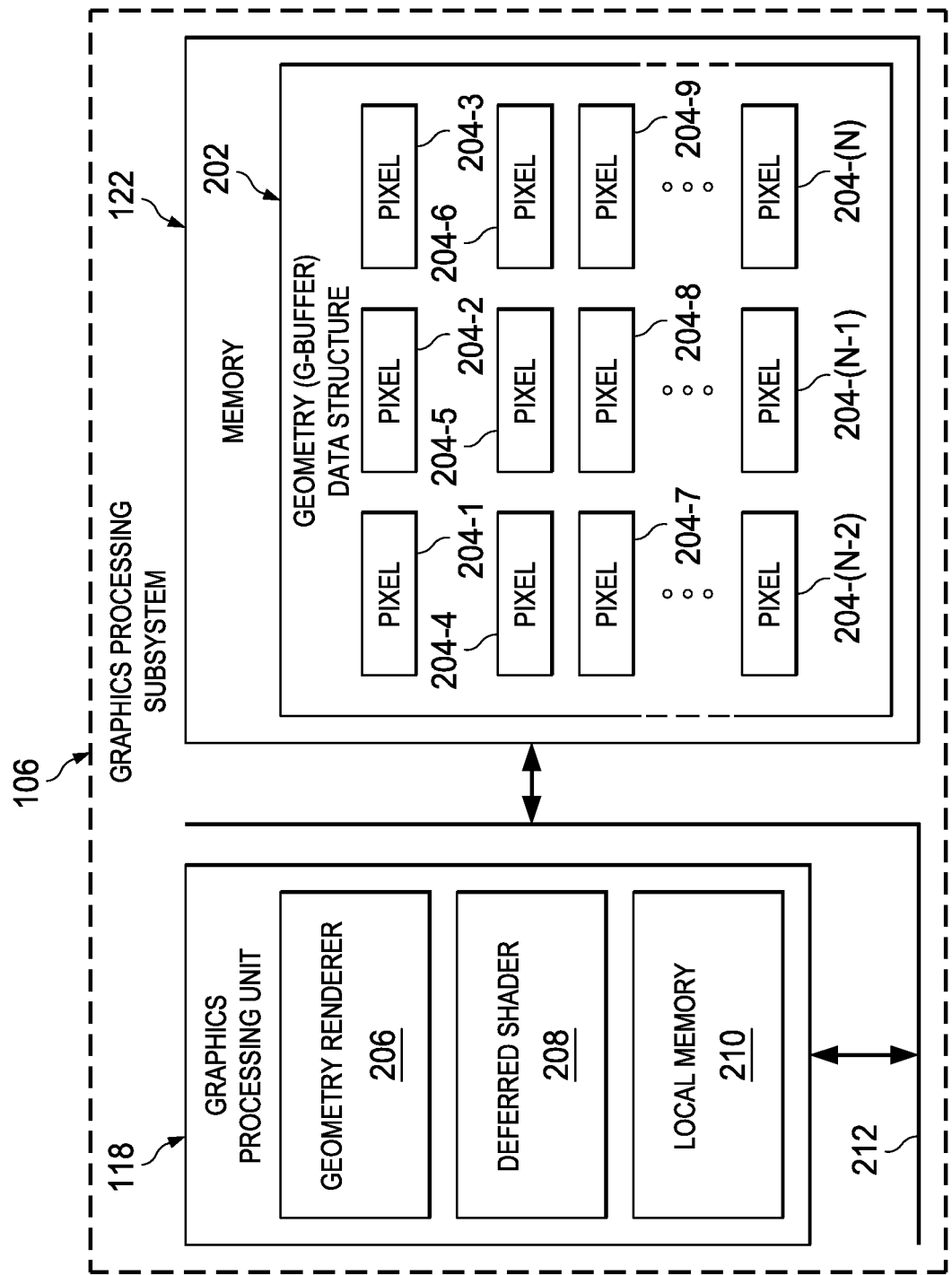
FIG. 2 is a block diagram of one embodiment of a graphics processing subsystem operable to carry out deferred shading.

FIG. 2 is a block diagram of one embodiment of graphics processing subsystem 106 of FIG. 1. Graphics processing subsystem 106 contains GPU 118 coupled to memory 122 by a data bus 212. GPU 118 contains a geometry renderer 206, a deferred shader 208 and a local memory 210. Alternate embodiments may omit on-chip memory 122 in favor of further utilizing memory 122. In the embodiment of FIG. 2, memory 122 is configured to store a geometry data structure, or G-buffer 202. G-buffer 202 is configured to store pixel-by-pixel information for a scene, or "frame." Information is organized as an array of pixels 204-1 through 204-N, where N is the number of pixels in a scene.

During geometry rendering, geometry renderer 206 rasterizes surfaces in the frame into N pixels to be displayed. Information is abstracted from the surfaces and stored in memory 122, specifically in G-buffer 202. Information stored in G-buffer 202 is merely a subset of the information available to geometry renderer 206. Once rasterized, the complete set of information is discarded from the graphics pipeline and the frame moves into a stage of the pipeline known as screen-space. Deferred shader 208 operates on each of pixels 204-1 through 204-N in screen-space. In certain embodiments deferred shader 208 performs a color shading function. In other embodiments it may perform an ambient occlusion function or possibly direct occlusion. A variety of deferred shading programs exist, including: bump mapping, shadows, specular highlights and translucency; and each employs certain pieces of per-pixel data from the G-buffer.

Figure 3:
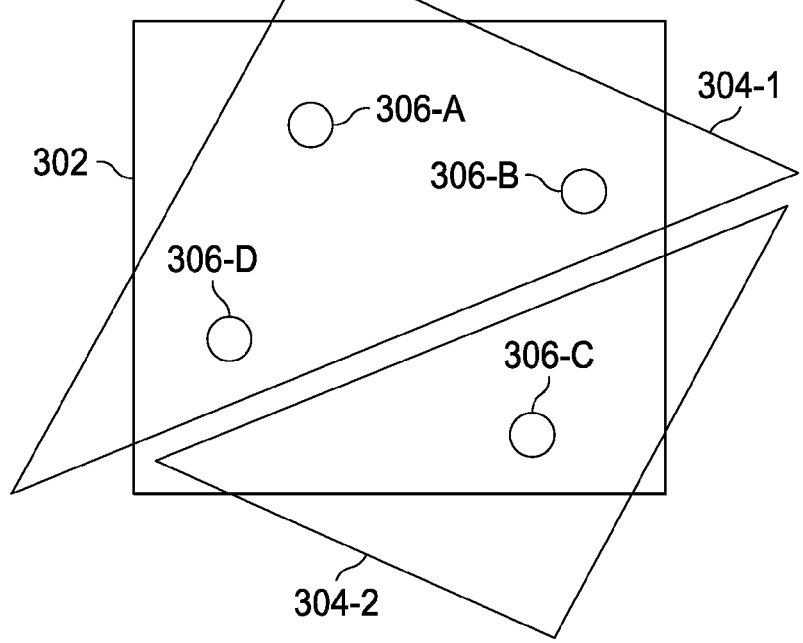
FIG. 3 is an illustration of a single multi-sampled pixel.

FIG. 3 is an illustration of a single multi-sampled pixel 302. Multi-sampling pixel 302 yields four samples: 306-A, 306-B, 306-C and 306-D. Alternate embodiments may generate more samples, and others generate fewer. The number of samples is proportional to the time it takes to process an image. Pixel 302 contains two surface fragments: 304-1 and 304-2. In this illustration, the boundary between surface fragments 304-1 and 304-2 runs through pixel 302. Absent anti-aliasing processing, this boundary would exhibit aliasing along the boundary. Pixel 302 would be shaded according to surface attributes for surface fragment 304-1, or according to surface attributes for surface fragment 304-2. Once combined with other pixels along the boundary, the boundary in the resulting image may appear jagged or distorted.

In the embodiment of FIG. 3, pixel 302 is multi-sampled, allowing it to be partially shaded according to surface attributes for surface fragment 304-1 and partially shaded according to surface attributes for surface fragment 304-2. Generally, sample 306-C would be shaded as surface fragment 304-2 and samples 306-A, 306-B and 306-D would be shaded as surface fragment 304-1.

A surface fragment coverage mask for sample 306-A would be [1 0 1 1]. The same mask serves as surface fragment coverage masks for samples 306-B and 306-D. A surface fragment coverage mask for sample 306-C would be [0 1 0 0]. If these four masks were combined into a coverage matrix, it would appear as follows:

$$\begin{bmatrix} 1 & 0 & 1 & 1 \\ 1 & 0 & 1 & 1 \\ 0 & 1 & 0 & 0 \\ 1 & 0 & 1 & 1 \end{bmatrix}.$$

The number of unique surface fragments in pixel 302 is observable by determining the number of unique masks in the coverage matrix: two. An appropriate mapping of unique surface fragments would map surface fragment 304-1 to samples 306-A, 306-B and 306-D, and map surface fragment 304-2 to sample 306-C.

Figure 4:
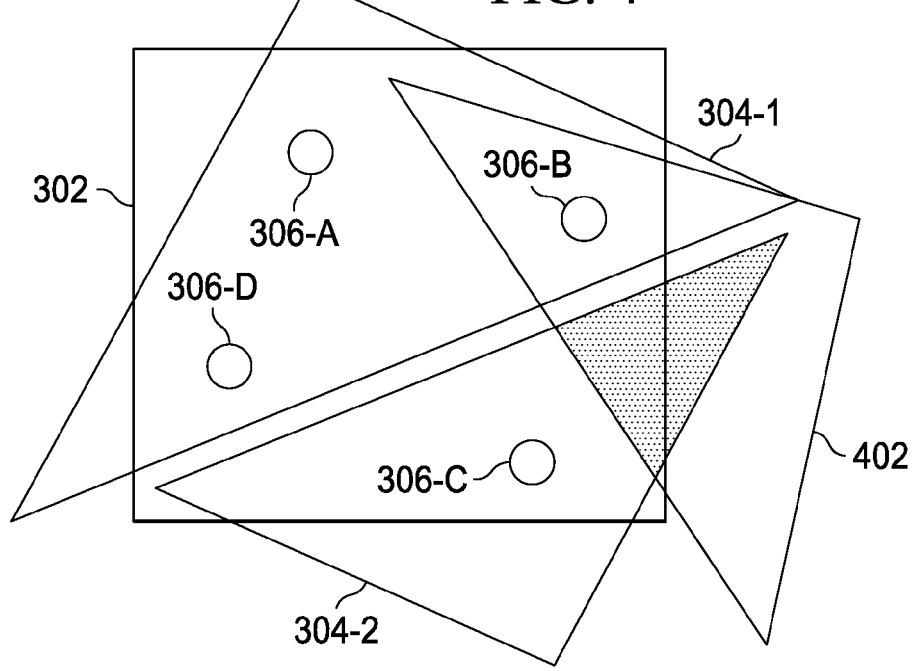
FIG. 4 is another illustration of a single multi-sampled pixel.

FIG. 4 is another illustration of multi-sampled pixel 302. In FIG. 4, pixel 302 contains three surface fragments: surface fragments 304-1 and 304-2 of FIG. 3, plus surface fragment 402. Surface fragment coverage masks for samples 306-A and 306-D are still [1 0 1 1], and the surface coverage mask for sample 306-C is still [0 1 0 0]. However, the surface coverage mask for sample 306-B is now [0 0 1 0], as surface fragment 402 now maps to sample 306-B. Accordingly, the coverage matrix is as follows:

$$\begin{bmatrix} 1 & 0 & 1 & 1 \\ 0 & 0 & 1 & 0 \\ 0 & 1 & 0 & 0 \\ 1 & 0 & 1 & 1 \end{bmatrix}.$$

The number of unique masks, or rows, is now three, and the mapping of unique surface fragments to samples now includes surface fragment 402.

With the addition of surface fragment 402, an ambiguity exists as to sample 306-B. Both surface fragment 304-1 and surface fragment 402 cover sample 306-B. This ambiguity may be resolved during geometry rendering, but sufficient data is lacking in screen-space. Consequently, a deferred shading program would not be able to resolve the ambiguity with the information available in the G-buffer. The ambiguity may, however, be resolved given the data available in the asymmetric coverage matrix above. The asymmetries in the matrix represent the ambiguity; therefore, rectifying the asymmetries resolves the ambiguities. The coverage matrix above may be made symmetric by a logical AND operation on the matrix and its transpose.

$$\begin{bmatrix} 1 & 0 & 1 & 1 \\ 0 & 0 & 1 & 0 \\ 0 & 1 & 0 & 0 \\ 1 & 0 & 1 & 1 \end{bmatrix} \text{AND} \begin{bmatrix} 1 & 0 & 0 & 1 \\ 1 & 0 & 1 & 1 \\ 0 & 1 & 0 & 0 \\ 1 & 0 & 0 & 1 \end{bmatrix} = \begin{bmatrix} 1 & 0 & 0 & 1 \\ 0 & 0 & 1 & 0 \\ 0 & 1 & 0 & 0 \\ 1 & 0 & 0 & 1 \end{bmatrix}.$$

An appropriate mapping and unique surface fragment count may be abstracted from the resulting symmetric coverage matrix. Surface fragment 304-1 maps to samples 306-A and 306-D, surface fragment 304-2 maps to sample 306-C and surface fragment 402 maps to sample 306-C.

In alternate embodiments, the surface fragment coverage information for pixel 302 may be represented by a post-Z coverage matrix that would lack the ambiguities seen in the coverage matrix above (the raster coverage matrix). The post-Z coverage matrix of certain embodiments would appear as follows:

$$\begin{bmatrix} 1 & 0 & 0 & 1 \\ 0 & 0 & 1 & 0 \\ 0 & 1 & 0 & 0 \\ 1 & 0 & 0 & 1 \end{bmatrix}.$$

Figure 5:
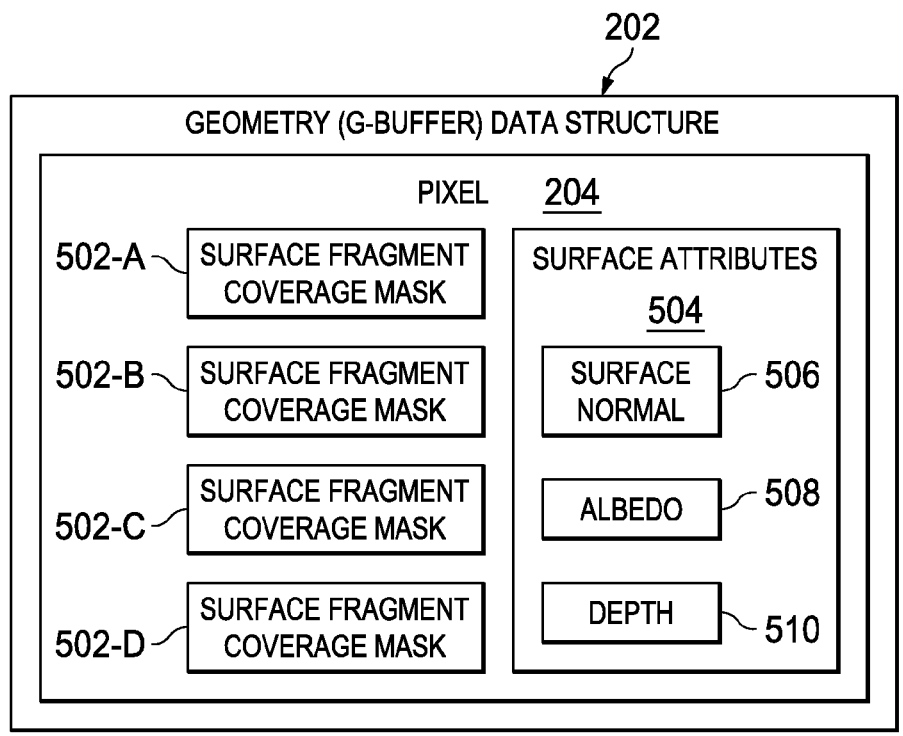
FIG. 5 is a block diagram of one embodiment of a G-buffer data structure containing surface fragment coverage masks.

FIG. 5 is a block diagram of one embodiment of G-buffer data structure 202 of FIG. 2, configured to store information for N pixels. In FIG. 5, G-buffer data structure 202 contains a single pixel 204; however, in implementation, G-buffer data structure 202 would contain data for all pixels in a scene. Pixel 204 contains surface fragment coverage masks for each pixel sample: surface fragment coverage masks 502-A, 502-B, 502-C and 502-D. Alternate embodiments may contain fewer samples, others may contain many more samples. In addition to surface fragment coverage masks, pixel 204 contains surface attributes 504 for each pixel sample, including, in the illustrated embodiment, a surface normal vector 506, an albedo factor 508 and a depth value 510. Surface attributes 504 may include many other parameters for pixel 204, including: a position with respect to a world reference frame, a material property, a color and a tangent vector. All information stored in the G-buffer is available in screen-space, or, in other words, available for deferred shading processes.

Figure 6:
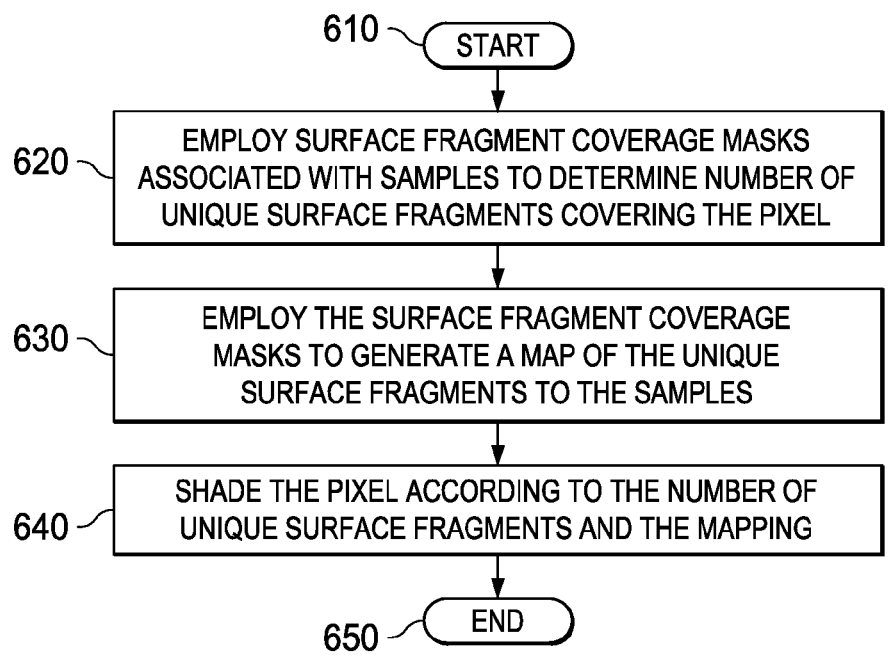
FIG. 6 is a flow diagram of one embodiment of a method of employing surface fragment coverage masks.

FIG. 6 is a flow diagram of one embodiment of a method of employing surface fragment coverage masks. The method begins at a start step 610. Surface fragment coverage masks for a pixel are combined into a matrix known as a coverage matrix. The coverage matrix is analyzed at step 620, where a count of unique surface fragments contained in the pixel is determined. The determination is made by counting the number of unique rows in the coverage matrix, which is essentially counting the number of unique surface fragments. At a step 630, the surface coverage masks, in the form of the coverage matrix, are employed to map the unique surface fragments to each sample of the pixel. Each sample is mapped to a single surface fragment. Each surface fragment is mapped to at least one sample. Shading is performed on the pixel at step 640, where the pixel is shaded in as many passes as there are unique surface fragments. Each shading pass correlates to a unique surface fragment and is carried out according to the map of unique surface fragments to samples. The method then ends at step 650.

Those skilled in the art to which this application relates will appreciate that other and further additions, deletions, substitutions and modifications may be made to the described embodiments.

What is claimed is:

1. A graphics processing subsystem operable to render a scene having a pixel represented by samples, comprising:
   a memory configured to store a geometry data structure associated with said pixel containing surface fragment coverage masks associated with said samples; and
   a graphics processing unit (GPU) configured to employ said surface fragment coverage masks to form a coverage matrix and carry out deferred shading on said pixel, wherein said GPU is further configured to rectify said coverage matrix such that said coverage matrix is symmetric before carrying out said deferred shading.

2. The graphics processing subsystem recited in claim 1 wherein said symmetric coverage matrix is a raster coverage matrix.

3. The graphics processing subsystem recited in claim 2 wherein said GPU is further configured to carry-out a bit-wise logical AND operation on said raster coverage matrix and a transpose of said raster coverage matrix.

4. The graphics processing subsystem recited in claim 1 wherein said surface fragment coverage masks form a post-Z coverage matrix.

5. The graphics processing subsystem recited in claim 1 wherein said geometry data structure further contains a normal vector associated with said pixel.

6. The graphics processing subsystem recited in claim 1 wherein said GPU is further configured to employ said surface fragment coverage masks to determine a number of unique surface fragments covered by said pixel and map said number of unique surface fragments to said samples.

7. A method of shading a pixel represented by samples in a previously rendered scene, comprising:
- employing surface fragment coverage masks associated with said samples in determining a number of unique surface fragments covering said pixel;
- employing said surface fragment coverage masks in generating a mapping of said unique surface fragments to said samples; and
- carrying out, using a streaming multiprocessor in a graphics processing unit, deferred shading on said pixel according to said number of unique surface fragments and said mapping;
- wherein a coverage matrix is formed from said surface fragment coverage masks and is rectified such that said coverage matrix is symmetric before carrying out said determining and said generating.

8. The method recited in claim 7 wherein said coverage matrix includes a raster coverage matrix.

9. The method recited in claim 8 wherein said coverage matrix is rectified by carrying out a bit-wise logical AND operation on said raster coverage matrix and a transpose of said raster coverage matrix.

10. The method recited in claim 7 wherein said surface fragment coverage masks includes a post-Z coverage matrix.

11. The method recited in claim 7 wherein said deferred shading comprises shading said pixel once for each of said unique surface fragments.

12. The method recited in claim 7 wherein each of said unique surface fragments covers a unique subset of said samples, said subset being unique with respect to all other subsets covered by each other of said unique surface fragments.

13. A graphics processing unit (GPU) operable to render a scene containing a pixel, comprising:
- a rasterizer configured to generate surface attributes associated with visible geometry within said pixel and surface fragment coverage masks associated with samples of said pixel;
- a memory configured to store a geometry data structure associated with said pixel containing:
  - said surface attributes, and
  - said surface fragment coverage masks; and
- a shader configured to employ said geometry data structure in carrying out deferred shading on said pixel;
- wherein said GPU is configured to employ said surface fragment coverage masks to form a coverage matrix and said GPU is further configured to rectify said coverage matrix such that said coverage matrix is symmetric before carrying out said deferred shading.

14. The GPU recited in claim 13 wherein said shader is further configured to employ said surface fragment coverage masks to determine a number of unique surface fragments covering said pixel and map said unique surface fragments to said samples.

15. The GPU recited in claim 13 wherein said symmetric coverage matrix is a raster coverage matrix.

16. The GPU recited in claim 15 wherein said GPU is further configured to carry out a bit-wise logical AND operation on said raster coverage matrix and a transpose of said raster coverage matrix.

17. The GPU recited in claim 13 wherein said surface fragment coverage masks form a post-Z coverage matrix.

18. The GPU recited in claim 13 wherein said surface attributes include albedo data associated with said pixel.

* * * * *